United States Patent
Atsatt

(10) Patent No.: US 7,814,472 B2
(45) Date of Patent: Oct. 12, 2010

(54) SYSTEM AND METHOD FOR SHARED CODE-SOURCING IN A JAVA VIRTUAL MACHINE ENVIRONMENT

(75) Inventor: Bryan Atsatt, Half Moon Bay, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1229 days.

(21) Appl. No.: 11/225,535

(22) Filed: Sep. 12, 2005

(65) Prior Publication Data

US 2007/0061798 A1    Mar. 15, 2007

(51) Int. Cl.
G06F 9/44 (2006.01)

(52) U.S. Cl. .................. 717/166; 717/167; 719/316; 719/332

(58) Field of Classification Search .............. None
See application file for complete search history.

(56) References Cited

U.S. PATENT DOCUMENTS

| | | | |
|---|---|---|---|
| 5,488,711 A * | 1/1996 | Hewitt et al. ............ 711/103 |
| 6,081,807 A * | 6/2000 | Story et al. ............ 707/101 |
| 6,321,323 B1 * | 11/2001 | Nugroho et al. ............ 712/34 |
| 6,442,565 B1 * | 8/2002 | Tyra et al. ............ 707/102 |
| 6,718,364 B2 | 4/2004 | Connelly et al. |
| 6,738,977 B1 | 5/2004 | Berry et al. |
| 6,748,396 B2 | 6/2004 | Kilcnik |
| 6,915,511 B2 | 7/2005 | Susarla et al. |
| 6,973,646 B1 | 12/2005 | Bordawekar et al. |
| 7,035,870 B2 | 4/2006 | McGuire et al. |
| 7,039,923 B2 | 5/2006 | Kumar et al. |
| 7,069,550 B2 | 6/2006 | Fraenkel et al. |
| 7,316,010 B1 | 1/2008 | Daynes et al. |
| 7,398,523 B2 | 7/2008 | Martin et al. |
| 7,516,331 B2 | 4/2009 | Jin et al. |
| 7,644,403 B2 | 1/2010 | Atsatt |
| 2003/0121031 A1 * | 6/2003 | Fraenkel et al. ............. 717/166 |
| 2005/0021487 A1 * | 1/2005 | Verma et al. ............... 707/1 |
| 2005/0027757 A1 * | 2/2005 | Kiessig et al. ............. 707/204 |
| 2005/0028152 A1 | 2/2005 | Hays et al. |

(Continued)

OTHER PUBLICATIONS

Bryan Atsatt and Debu Panda, "Classloading in Oracle9iAS Containers for J2EE", Jan. 2003, Oracle Corp., retrieved online at <http://www.oracle.com/technology/tech/java/oc4j/pdf/ClassLoadingInOC4J_WP.pdf>.*

(Continued)

*Primary Examiner*—James Rutten
(74) *Attorney, Agent, or Firm*—Townsend and Townsend and Crew LLP

(57) ABSTRACT

A system and method for code-source sharing between class loaders in a java virtual machine environment (JVM). Specifically, a central repository for referencing a plurality of code-sources for java class loaders in a JVM environment is described. Each entry for a shared code-source in the central repository includes a reference to a code-source that potentially could be shared by multiple class loaders of a plurality of class loaders in the JVM environment. The central repository manages an instance of the code-source for use in the JVM environment by the plurality of class loaders. A state of the code-source is provided. In addition, a list of subscribing class loaders to the code-source is also provided.

16 Claims, 8 Drawing Sheets

U.S. PATENT DOCUMENTS

| | | | |
|---|---|---|---|
| 2005/0060698 | A1 | 3/2005 | Boykin et al. |
| 2005/0154785 | A1 | 7/2005 | Reed et al. |
| 2006/0070051 | A1 | 3/2006 | Kuck et al. |
| 2006/0143622 | A1 | 6/2006 | Prabandham et al. |
| 2006/0206903 | A1* | 9/2006 | Lawrence et al. ........... 719/313 |
| 2006/0248140 | A1* | 11/2006 | Birenheide .................. 709/203 |
| 2007/0006203 | A1 | 1/2007 | Marwinski |

OTHER PUBLICATIONS

Richard S. Hall, "A Policy-Driven Class Loader to Support Deployment in Extensible Frameworks:", May 3, 2004, Springer Berlin / Heidelberg, Lecture Notes in Computer Science: Component Development, vol. 3083/2004, pp. 81-96.*

Hovenmeyer, David and Pough, William, "More Efficient Network Class Loading through Building," Proceedings of the 2001 Symposium on Java TM Virtual Machine Research Technology Symposium—vol. 1, 2001, 13 pages.

OSGI Alliance, "About the OSGI Service Platform," Technical Whitepaper, Revision 3.0, Jun. 12, 2004, pp. 1-17.

OSGI Alliance, "OSGI Service Platform Core Specification," Aug. 2005, pp. 1-276.

Krause, Jens and Plattner, Bernhard, "Safe Class Sharing among Java Processes," Research Report, Apr. 24, 2000, http://www.zurich.ibm.com/pdf/rz3230.pdf, pp. 1-14.

"JAR File Specification", Sun Microsystems, retrieved online at http://web.archive.org/web/20000815091814/http://java.sun.com/j2se/1.3/docs/guide/jar/jar.html, 11 pages.

* cited by examiner

SYSTEM AND METHOD FOR SHARED CODE-SOURCING IN A JAVA VIRTUAL MACHINE ENVIRONMENT

RELATED UNITED STATES PATENT APPLICATIONS

This Application is related to U.S. patent application Ser. No. 11/224,893 by Bryan Atsatt, filed on Sep. 12, 2005, entitled "Method and System for Automated Root-Cause Analysis for Class Loading Failures in Java," assigned to the assignee of the present invention. To the extent not repeated herein, the contents of this related patent application are hereby incorporated herein by reference.

This Application is related to U.S. patent application Ser. No. 11/224,853 by Bryan Atsatt, filed on Sep. 12, 2005, entitled "Method and System for Automated Code-Source Indexing in a Java Virtual Machine Environment," and assigned to the assignee of the present invention. To the extent not repeated herein, the contents of this related patent application are hereby incorporated herein by reference.

This Application is related to U.S. patent application Ser. No. 11/225,143 by Bryan Atsatt, filed on Sep. 12, 2005, entitled "A Shared Loader System and Method," assigned to the assignee of the present invention. To the extent not repeated herein, the contents of this related patent application are hereby incorporated herein by reference.

This Application is related to U.S. patent application Ser. No. 11/225,144 by Bryan Atsatt, filed on Sep. 12, 2005, entitled "A Bulk Loading System and Method," assigned to the assignee of the present invention. To the extent not repeated herein, the contents of this related patent application are hereby incorporated herein by reference.

BACKGROUND OF THE INVENTION

1. Field of the Invention

Embodiments of the present invention relate to the field of class loading in a Java Virtual Machine environment. More particularly, embodiments of the present invention relate generally to shared code-sources in the Java Virtual Machine environment.

2. Related Art

Java programs are composed of named classes (e.g., "java.lang.String") and other data is referred to as resource data (e.g., "resource". Classes and resources are loaded into a Java Virtual Machine (JVM) by a class loader. Each class loader contains one or more code-sources (e.g., class or resources archives, such as ".jar" or ".zip" files) from which to obtain class files that are converted into class instances or resource data for application use. Class and resource names are prefixed by a "package" name, such as "java.lang" for the "String" class. Generally, many classes share a package name.

The term "class loading" refers to the process of locating the bytes for a given class name and converting them into a Java class instance. All "java.lang.Class" instances within a JVM start life as an array of bytes structured in the class format defined by the JVM specification.

Class loading is performed by the JVM during the startup process, and subsequently by subclasses of the "java.lang.ClassLoader" class. These "classloaders" provide an abstraction that allows the JVM to load classes without any knowledge of where the class bytes come from. This enables both local and remote storage as well as dynamic class generation. Furthermore, class loaders provide "dynamic-loading" capabilities that provide a great deal of extensibility to the Java language and are the basis for the mobile code capabilities of the Java language. In addition to loading classes, classloaders can be used to load native code (e.g., .dll files).

A classloader is a subclass of the "java.lang.ClassLoader" class that is responsible for loading classes. In a JVM environment class loaders are arranged in a tree hierarchy, where each class loader has a single parent. Each class loader is designed to work with one or more code-sources. For example, each classloader contains one or more code-sources that are class or resource archives (e.g., jars, zip files, etc.) from which to obtain class files to convert into class instances or resource data for application use.

A code-source is a root location from which the classloader searches for classes. Although the name implies the loading of classes only, class loaders can be used to load any file from the configured code-sources using, for example, the "getResource" and "getResourceAsStream" methods. Code-sources can be defined to represent physical storage of binary class files, java sources that must first be compiled, or even classes generated on the fly. For example, a code-source can be a directory, a zip file, a jar file, etc. A classloader uses each code-source, along with a class package name, to define a location to search for classes.

When a class load event occurs, a class loader is selected (e.g., the "initiating" classloader) to search for the class. In a standard search algorithm, the classloader searches up the parent chain in the classloader tree of the JVM environment before searching for the class in the initiating classloader. Each loader visited during the search must consult its list of code-sources to try to find the class. The classloader that locates and converts the class file into a class instance is referred to as the "defining" loader. The first matching class is returned. Once loaded, the class is added to a cache that is used to short-circuit the search process, thus avoiding code-source consultation.

In complex JVM environment that contain multiple class loaders, it is relatively common for multiple class loaders to be configured with the same code-source. For example, for a given class with name "N", only one instance of class N may exist within a given classloader. However, the same class can be loaded by two different classloaders. In this case, the JVM will consider each class to be further qualified by the ClassLoader instance that loaded it.

When this occurs within the JVM environment, each class loader that opens and manages the code source containing class N, does so separately. This consumes scarce operating system resource.

SUMMARY OF THE INVENTION

A system and method for code-source sharing between class loaders in a java virtual machine environment (JVM). Specifically, a central repository for referencing a plurality of code-sources for java class loaders in a JVM environment is described. Each entry for a shared code-source in the central repository includes a reference to a code-source that potentially could be shared by multiple class loaders of a plurality of class loaders in the JVM environment. The central repository manages an instance of the code-source for use in the JVM environment by the plurality of class loaders. A state of the code-source is provided. In addition, a list of subscribing class loaders to the code-source is also provided.

DETAILED DESCRIPTION OF THE INVENTION

Figure 1:
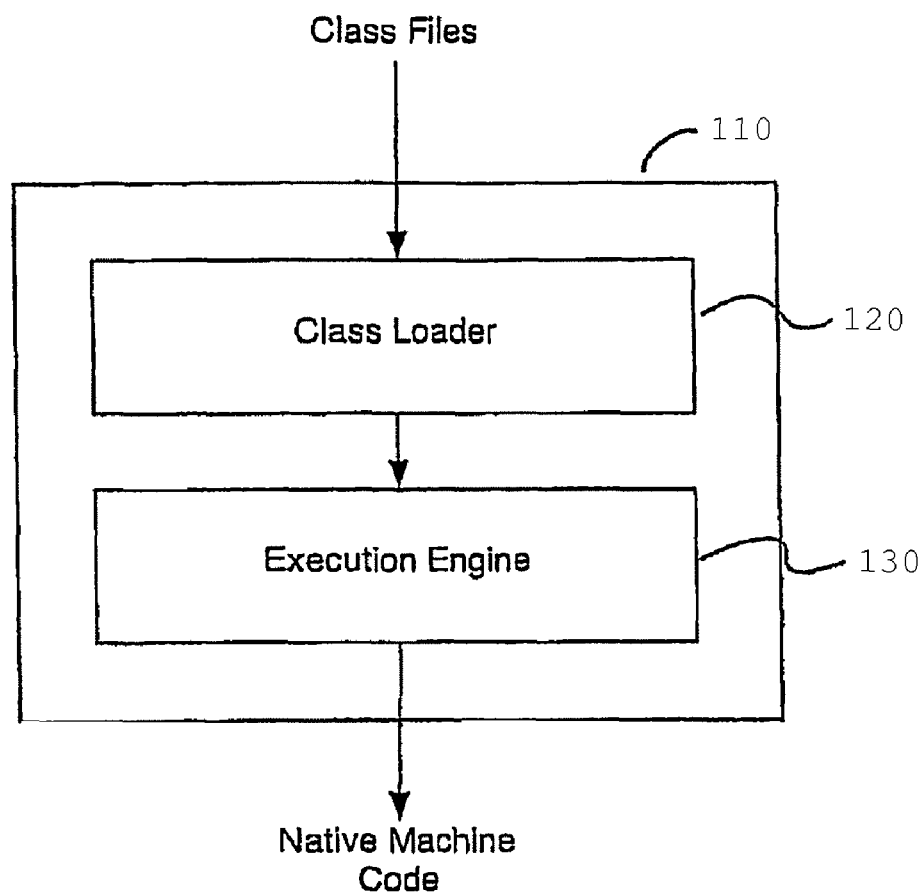
FIG. 1 is a block diagram illustrating a Java Virtual Environment (JVM) in a computing environment, in accordance with one embodiment of the present invention.

Reference will now be made in detail to the preferred embodiments of the present invention, a system and method for shared code-sources in a java virtual machine (JVM) environment, examples of which are illustrated in the accompanying drawings.

Accordingly, various embodiments of the present invention disclose a system and method for shared code-sources in a JVM environment that can be implemented for class loading. In particular, embodiments of the present invention provide for a centralized management of code-sources in a JVM environment, regardless of the class loader. In addition, embodiments of the present invention significantly reduces memory and operating system resources used for managing code-sources in a JVM environment. Also, embodiments of the present invention are capable of providing updates to the shared code-source files stored on disk during active usage. Furthermore, embodiments of the present invention provide for access to diagnostic information through the centralized management of code-sources.

Notation and Nomenclature

Embodiments of the present invention can be implemented on software running on a computer system. The computer system can be a personal computer, notebook computer, server computer, mainframe, networked computer, handheld computer, personal digital assistant, workstation, and the like. This software program is operable for providing a Java Virtual Machine (JVM environment). In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art.

A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "augmenting," "determining," "discovering," and "accessing," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Java Virtual Machine Environment

A JVM is an environment from which Java programs are executed. Since the JVM environment can be implemented in software, the JVM can be platform independent. As such, Java programs can be executed on any device supporting a JVM environment. In general, a Java program is expressed as source files that are compiled into Java class files. The Java class files are executed in the JVM.

FIG. 1 is a block diagram illustrating a JVM 110 in a computing environment, in accordance with one embodiment of the present invention. The computing environment can be any computing platform, such as a computer, such as a personal computer, cell phone, television, or any suitable electronic device. The JVM 110 is comprised of a class loader 120 and an execution engine 130.

The class loader 120 loads class files that are accessible by the JVM 110. For instance, the Java program is compiled into class files accessible by the JVM. These class files may be program specific, or associated with the Java application program interface (API). The Java API is composed of a set of runtime libraries of class files that are accessible to any JVM, and are platform independent. As such, the class loader loads the class files that are referred to by the Java program.

The execution engine 130 runs the class files. That is, after the JVM 110 loads class files, the execution engine 130 executes the bytecodes for the methods contained within the class files. Bytecodes can be interpreted as the machine language of the JVM. As such, the execution engine 130 translates the bytecodes from the class files into native machine code that is executable by the computing platform supporting the JVM environment.

Figure 2:
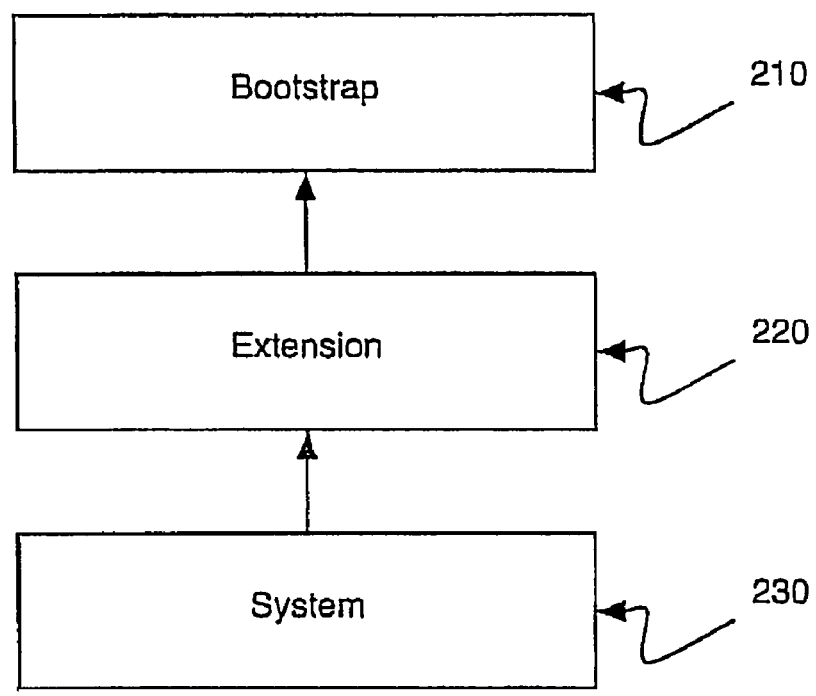
FIG. 2 is a block diagram illustrating a class loading architecture in a Java 2 Standard Edition (J2SE) environment, in accordance with one embodiment of the present invention.

FIG. 2 is a block diagram illustrating the class loading tree, or architecture, 200 in a Java 2 Standard Edition (J2SE) environment, for example, in accordance with one embodiment of the present invention. The J2SE environment includes a bootstrap class loader 210, an extension class loader 220, and a system class loader 230.

The bootstrap class loader 210 is responsible for loading the core Java classes. The bootstrap class loader 210 is unique in that it is not actually a subclass of "java.lang.ClassLoader" but is implemented by the JVM itself. The bootstrap class loader 210 loads classes in some default manner (e.g., from a local disk).

The extension class loader 220 is responsible for loading classes from the jars in the JRE's extension directory (e.g., jre/lib/ext or as specified by the java.ext.dirs system property). This provides a standard mechanism to introduce new functionality beyond the core Java classes introduced by the bootstrap class loader 210.

The system class loader 230 is responsible for loading classes from the directories and jars listed on the command-line and/or the "java.class.path" system property when the JVM is invoked. If not otherwise specified, any user-instantiated class loader will have this loader as its parent.

Class loading in the J2EE JVM environment is component based. That is, applications are not monolithic, rather they are collections of components (EJBs, Servlets, JSPs, Resource Adapters, etc.) that have predefined packaging (e.g., using JAR, WAR, and RAR files) and deployment directory structures as well as an umbrella packaging structure (e.g., EAR files).

Figure 3:
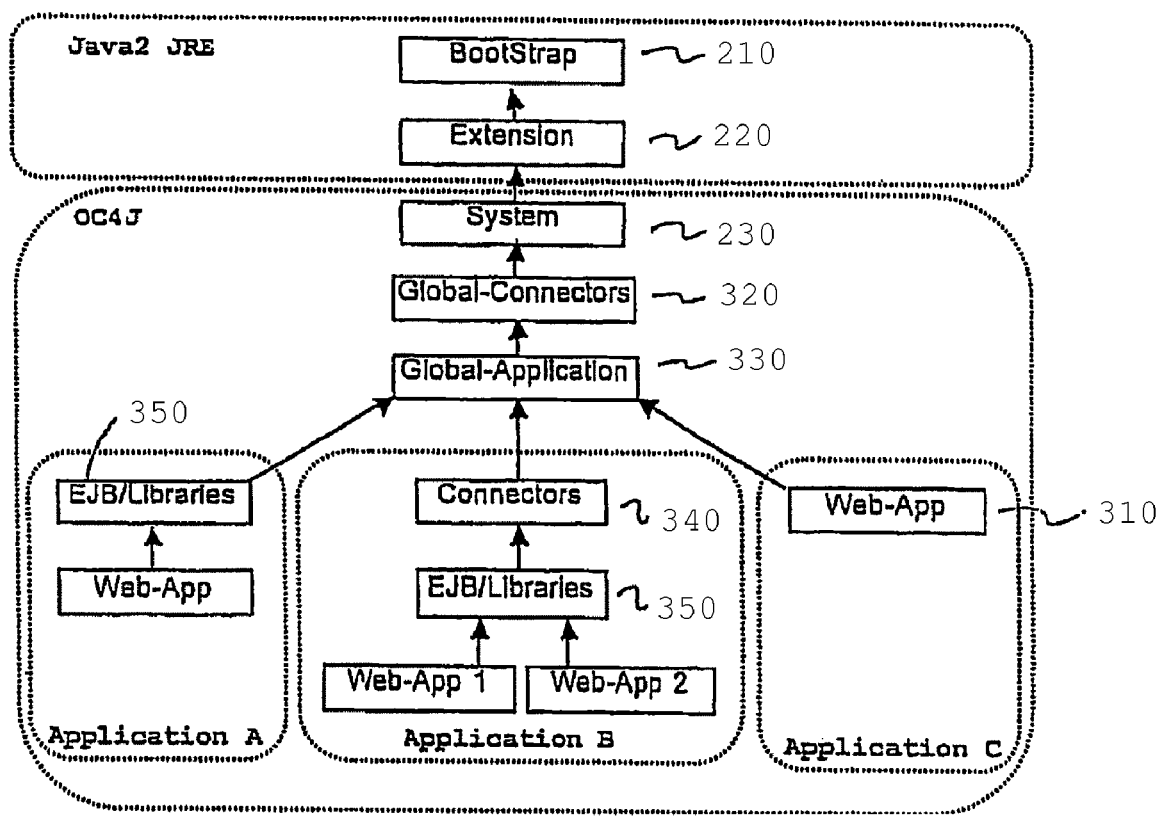
FIG. 3 is a block diagram illustrating an exemplary class loading architecture in a Java 2 Enterprise Edition (J2EE) environment, in accordance with one embodiment of the present invention.

FIG. 3 is a block diagram illustrating an exemplary class loading architecture 300 in a J2EE environment, in accordance with one embodiment of the present invention. As shown in FIG. 3, the class loading architecture of the J2SE environment is included in the bootstrap 210, extension 220, and system 230 class loaders. As such, the J2EE utilizes the default Java Runtime Environment (JRE) supplied system class loader 230 to load and launch class files.

As shown in FIG. 3, the J2EE class loading architecture 300 can be quite complex, having 3 different applications, as follows: application A, application B, and application C. Application A has a single class loader 310. Applications A and B have multiple class loaders. In J2EE each application has at least one class loader which have different configuration mechanisms that control which code-sources associated with class files end up in the class loader.

Also shown in FIG. 3 is a global connector class loader 330 that contains all code-sources from RAR files referenced in a global connector file (e.g., connectors.xml file). The global application loader contains all code-sources from any <library> tags in the global application.xml file. In application B, the "connectors" class loader 340 contains all code-sources from any application RAR files. The "ejb/libraries" class loader 350 contains all code-sources from any <ejb> tags in application.xml, and from any applicable <library> tags. The web application loader contains code-sources from WAR files, any <classpath> tags, and any <library> tags.

The system class loader 230 becomes part of the parent chain for all subsequent class loaders below it. For example, the class loaders created for the applications A, B, and C all have the system loader in their parent chain. As a result, classes bundled at the application level that also exist at the system level will never be loaded from the application using the standard search mechanism. The standard class loader search-order requires consulting the parent loader first, and any hit stops the search.

Policy Class Loaders

Embodiments of the present invention describe a new type of class loader, a policy class loader ("PolicyClassLoader"). This policy class loader is a subclass of the "java.lang.Class-Loader," in accordance with one embodiment. This new type uses composition rather than inheritance to achieve flexibility within a class loading architecture.

In addition, embodiments of the present invention are able to offer concrete corrective suggestions where possible. Achieving this requires replacing all instances of class loaders, including the JVM supplied "system" and "extension" class loaders with the new type, the policy class loader, in one embodiment.

While embodiments of the present invention are described within the context of loading classes, other embodiments of the present invention are well suited to the context of loading resources.

Figure 4:
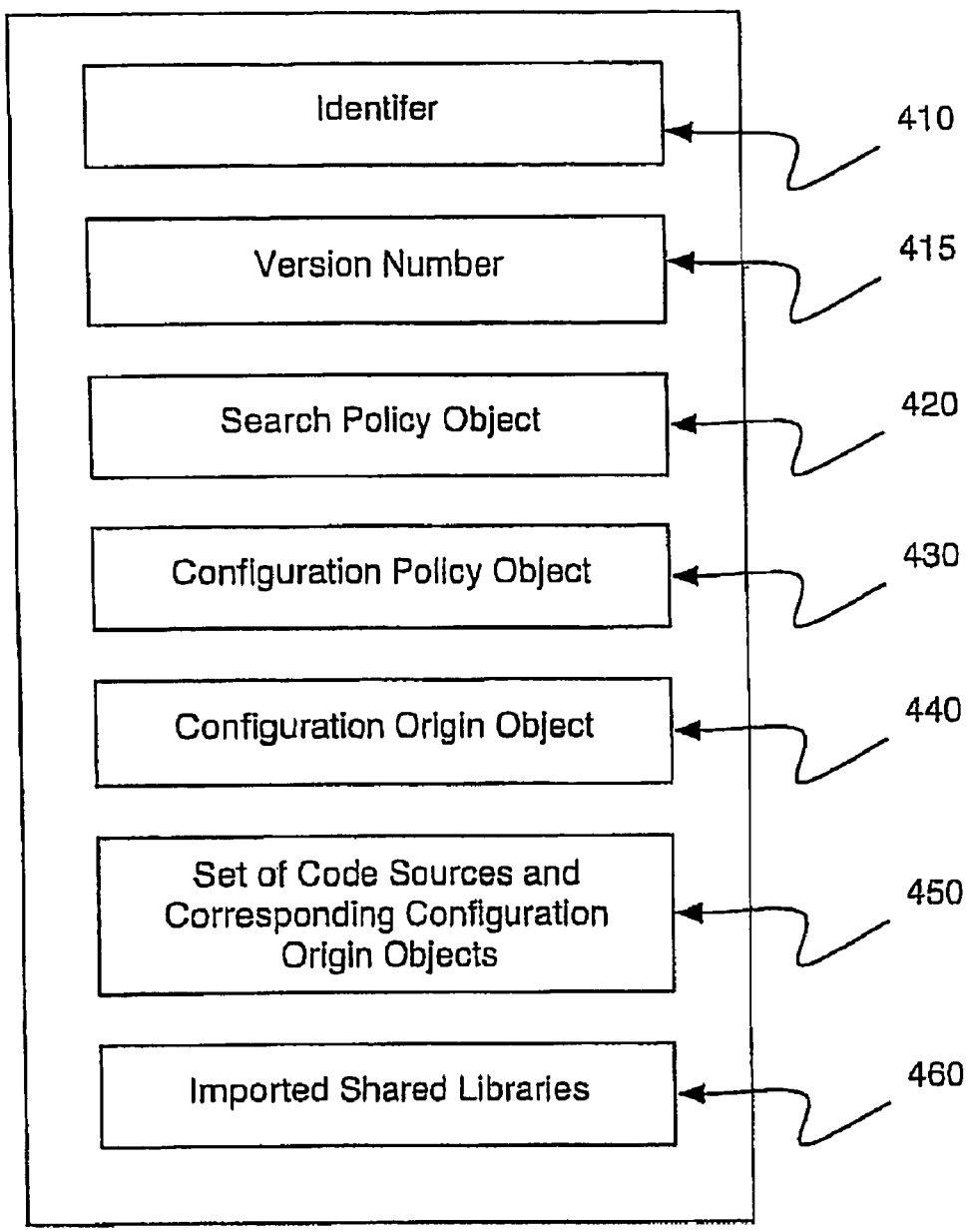
FIG. 4 is a block diagram illustrating a policy class loader that is capable of providing code-source sharing between class loaders in a JVM environment, in accordance with one embodiment of the present invention.

FIG. 4 is a diagram illustrating a policy class loader 400 that is capable of implementing shared code-sources, in accordance with one embodiment of the present invention. The policy class loader 400 is provided for each class loader in a class loader tree of a Java Virtual Machine (JVM) environment. The policy class loader 400 loads classes in the JVM environment and is able to have, or have access to, new state and meta-data which is used to analyze class loading error conditions. As shown in FIG. 4, the policy class loader 400 comprises an identifier, a version number, a search policy object, a configuration policy object a configuration origin object, a set of code-sources each with their own configuration origin object, and imported shared libraries.

The identifier 410 includes a descriptive name (e.g., "xml.xerces"). The version number 415 (e.g., 1.5.0) corresponds to the version of the policy class loader. The version numbers are preconfigured for some class loaders. For other class loaders, the version number is assigned by the runtime. The combination of the descriptive name and the version number (e.g., "xml.xerces" 1.5.0) is unique within a JVM environment.

The search policy object 420 defines search procedures to discover and load a class by the associated policy class loader. For example, the search policy object 420 enables composition of any set of steps required to find and load a class or resource. The instance passed to the constructor will be used by default, but alternate entry points exist that allow the policy to be passed in, thus enabling very flexible search behaviors. There are many pre-defined search policies, but other examples of search policies in addition to the standard search policy that may be defined and used by the search policy object 420 includes the following: 1) generation of source file(s); 2) compilation of source file(s); 3) generation of source file(s); 4) index consultation for acceleration, etc.

In addition, the search mechanism could also be used to filter class access, which prevents the return of a class, based on some predefined criteria, in one embodiment.

For example, the search policy object may define the search mechanism to be a standard search mechanism, in one embodiment. The standard search mechanism searches up the parent chain to locate the class file. For instance, each class loader instance has an associated parent class loader as well as a cache for previously loaded classes. When called to load a class, the class loader, the initiating class loader, first looks in its cache, and if no class if found, it will delegate to its parent. If the parent cannot return the class, the class loader will attempt to find the class itself in its code-sources. This is a recursive process that goes to the top level in the class loader tree.

In another example, the search policy object may define the search mechanism used for web applications. That is, the class loader first looks locally to load the class. For instance, the class loader first looks for the class in the cache of the JVM. If the class is not found, then the local code-sources are examined to discover the class. If the class is not found locally, then the class is looked for in imported shared class loaders. If the class is still not found, then the class is looked for up the parent chain.

Also shown in FIG. 4 is a configuration policy object 430. The configuration policy manages the configuration of the class loader. This ensures consistent usage and provides additional meta-data for diagnostics. For example, the configuration policy object 430 may define categories for class loaders by the role of the contained classes, as follows: 1) a system class loader that contains internal classes and API classes; 2) a shared class loader for classes shared across loader hierarchies; and 3) an application class loader for application specific classes.

In addition, FIG. 4 illustrates at least one configuration origin object 440. The configuration origin object 440 comprises metadata for describing interrelationships between the policy class loader to other class loaders in the class loader tree. For example, the configuration origin object describes what configuration in the system caused this loader to be created (e.g., an application deployed in a server). That is, the configuration origin object 440 describes a generic type of configuration, such as a specific origin of the configuration origin object (e.g., file name). For instance, the configuration origin object may include the path to the configuration file itself that caused the class loader to be created.

Also, the configuration origin object 440 of a class loader may describe all of the external configuration options that are available to modify the contents within the class loader. For instance, the object 440 may include a list of external configuration options available for modifying contents of the policy class loader.

The policy class loader 400 also includes a set of code-sources 450. Each of the code-sources in the set 450 is loadable by the policy class loader 400. Each code-source in the set of code-sources 450 is also configured with at least one configuration origin object. The configuration origin object comprises metadata for describing interrelationships between the code-source to other classes in the class loader tree. For example, the configuration origin object may include the path to the configuration file itself that caused the code-sources to be added to the class loader.

For example, code-sources can be labeled with the configuration option used to add it to the class loader, as well as the specific configuration file that was used. Additionally, the configuration origin object 440 specifies whether the code-source manifest "Class-Path" or "Extension-List" attributes should be processed. In one embodiment, a single code-source can have multiple configuration origins. For example, two different applications may reference the same code-source but have different origin files.

Additionally, generally available information used for troubleshooting is discoverable through the policy class loader 400 and provides additional configuration information that describe how a class loader is created. For example, the class loader that forms the root of the class loader tree is available and identified. Also, each class loader can provide a list of all of its children class loaders. In addition, a list of parent class loaders for a particular class loader is discoverable by walking up its parent chain. Further, class loaders are labeled with their role and scope. For instance, roles may be defined as system, application, or shared class loaders.

In addition, the class loader may include information that lists all of the code-sources contained within the class loader or is accessible by the policy class loader.

The policy class loader also includes imported shared libraries 460. The imported shared libraries disclose the concept of a shared class loader, in accordance with one embodiment of the present invention. That is, a shared class loader can be referenced by multiple loaders, but is outside of the normal parent chain.

Also, additional configuration information is discoverable through various query mechanisms. That is, configuration information is accessed or searched through query mechanisms. For example, a list of classes accessible by the list of code-sources is discoverable. Further, given a specific class, all of the classes upon which that class is directly dependent is discoverable.

In another embodiment, the policy class loader further comprises a security policy. The security policy outlines protective measures taken within the class loader tree. Class loaders play a vital role in forming the association between a class instance and it's code-source. As such, the security policy of the class loader can play a vital role in securing the code-sources in the class loader tree.

While the present embodiment includes the previously defined objects for a policy class loader, other embodiments are well suited to additional objects including additional information as prescribed within the policy class loader.

Shared Code-Sources

Figure 5:
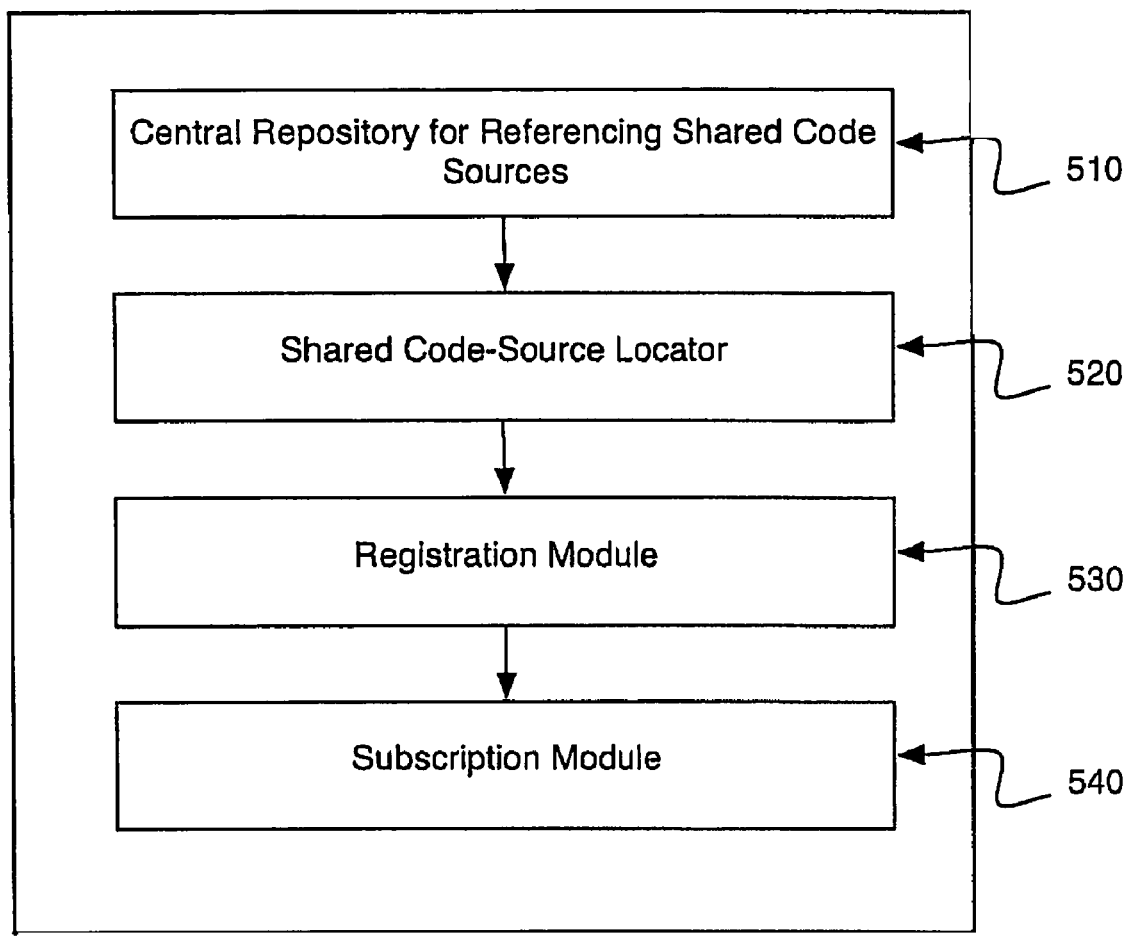
FIG. 5 is a block diagram of a system 500 that is capable of shared code-sources for class loading in a JVM environment, in accordance with one embodiment of the present invention.

FIG. 5 is a block diagram of a system 500 that is capable of shared code-sources for class loading in a JVM environment, in accordance with one embodiment of the present invention. The present embodiment enables the centralized reference for all code-sources that are used in a JVM environment. The system 700 includes a central repository 510, a shared code-source locator 520, a registration module 530, and subscription module 540.

The central repository 510 stores the instances and objects for code-sources that are called by class loaders in a JVM environment. That is, the central repository is used to reference a plurality of code-source for java class loaders in the JVM environment.

More specifically, the central repository 510 provides a list of all the shared code-source instances that are used in the JVM environment. That is, the central repository provides a list of all the code-source instances used in the JVM environment so that all class loaders that are loading a single class (e.g., class Foo) in a method will be directed to one object in the JVM environment, the instance of the shared code-source (e.g., code-source foo.jar) stored in the central repository 510. An instance of a code-source is managed within the central repository 510 for use in the JVM environment by the plurality of class loaders.

In addition, the use of the central repository guarantees that each instance of code-sources in the central repository 510 are unique within the JVM environment, in accordance with one embodiment of the present invention. That is, embodiments of the present invention can ensure that there is only one instance for any given code-source file.

As such, for a given code-source, there is only one object that needs to manipulated for performing operations on an associated code-source (e.g., opening the code-source, closing the code-source, etc.). For example, there is only one object that can open the code-source, and one object that can close the code-source.

In one embodiment, the type of code-source supported for file system access is a shared jar type of code source for .jar and .zip files. In another embodiment, the type of code-source supported for file system access is a shared directly type of code-source for file system directories.

The system 500 also includes a shared code-source locator 520. The locator 520 provides a mechanism to locate existing shared code-sources. The mechanism employed by the locator 520 locates the existing, shared code-source by identifying the code-source. For example, the code-source is identified by a unique canonical name within the JVM, in accordance with one embodiment of the present invention. Other means for identifying the shared code-source are provided in relation to FIG. 6.

The system 500 also includes a registration module 530. The registration module creates and register new shared code-source instances when needed. For example, the registration module 530 creates and registers a code-source to the central repository 500 the first time that code-source is loaded within the JVM environment.

The system 500 also includes a subscription module 540. The subscription module enables class loaders to subscribe to particular code-sources in the central repository 510. That is, when a class loader loads a particular code-source located in the central repository 510, that class loader is listed as a subscriber to the particular code-source.

Additionally, the subscription module 540 unsubscribes a class loader from a particular code-source. That is, when a class loader is no longer associated with the code-source, one embodiment of the present invention takes the class loader off the list of subscribers associated with the particular code-source.

Figure 6:
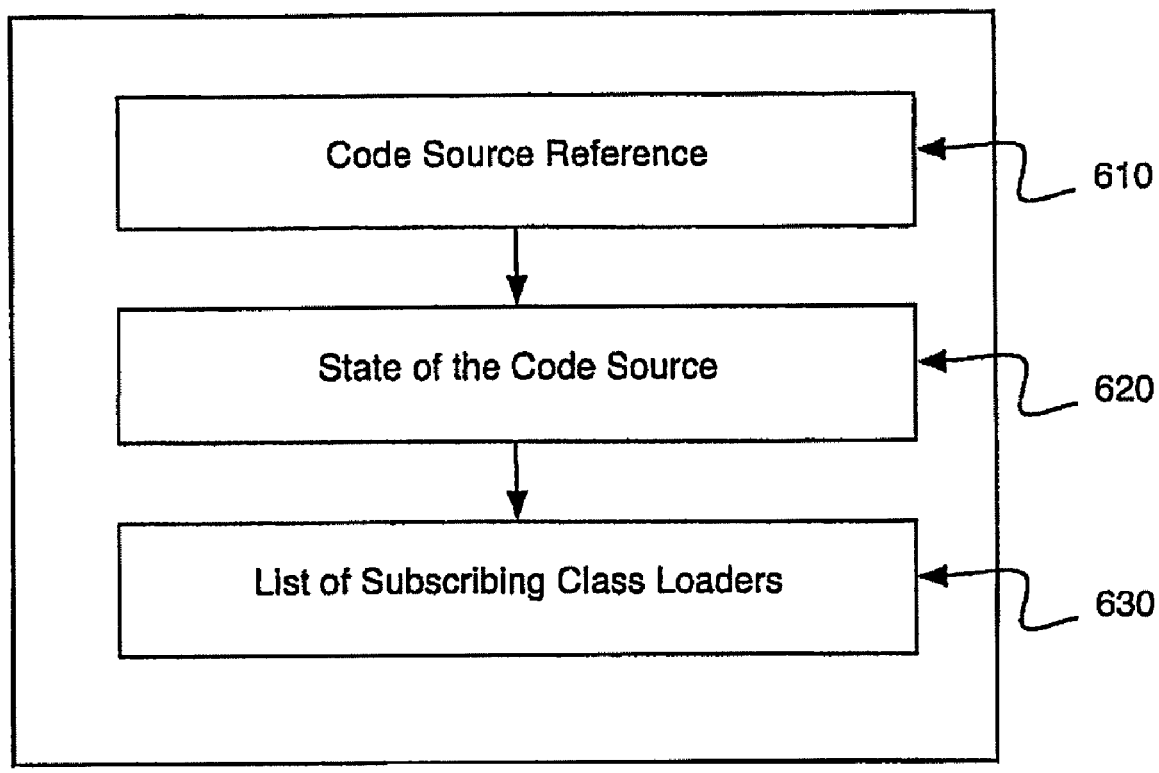
FIG. 6 is a block diagram of the central repository 510 of FIG. 5, in accordance with one embodiment of the present invention.

FIG. 6 is a block diagram of the central repository 510 of FIG. 5, in accordance with one embodiment of the present invention. More specifically, FIG. 6 illustrates an abstraction for a particular shared code-source. Shared code-sources are manages by the central repository 510, and subscribed to by individual loaders. Duplication of a code-source is relatively common, and the use of the central repository 510 reduces memory footprint and file handling usage.

As shown in FIG. 6, the central repository 510 includes a reference to each code-source in the repository 510. The code-source potentially could be shared by multiple class loaders of a plurality of class loaders in the JVM environment. That is, instead of having multiple instances of the same code-source in the JVM environment, the central repository 510 allows for the generation of only one instance of the code-source that is referenced by the code-source reference 610 of FIG. 6.

The reference in the code-source reference 610 is a canonical name, in accordance with one embodiment. The canonical name is unique in the JVM environment. As such, the present embodiment provides for the conversion of the class into the canonical form of the class file. This allows for various methods to call the same object as referenced by the canonical name within the JVM environment. This is possible, even though different path names, different strings, etc. before the conversion to the canonical name that all point to the same code-source are used. In this way, only one canonical name need be used for accessing the class file.

In another embodiment, the reference to the code-source is a file name. This is possible for use when the file name is unique within the JVM environment, and that all similar file names refer to the same call file or have the same functionality. The advantage is that a look-up of a file name uses minimal resources, and is fast.

Figure 7:
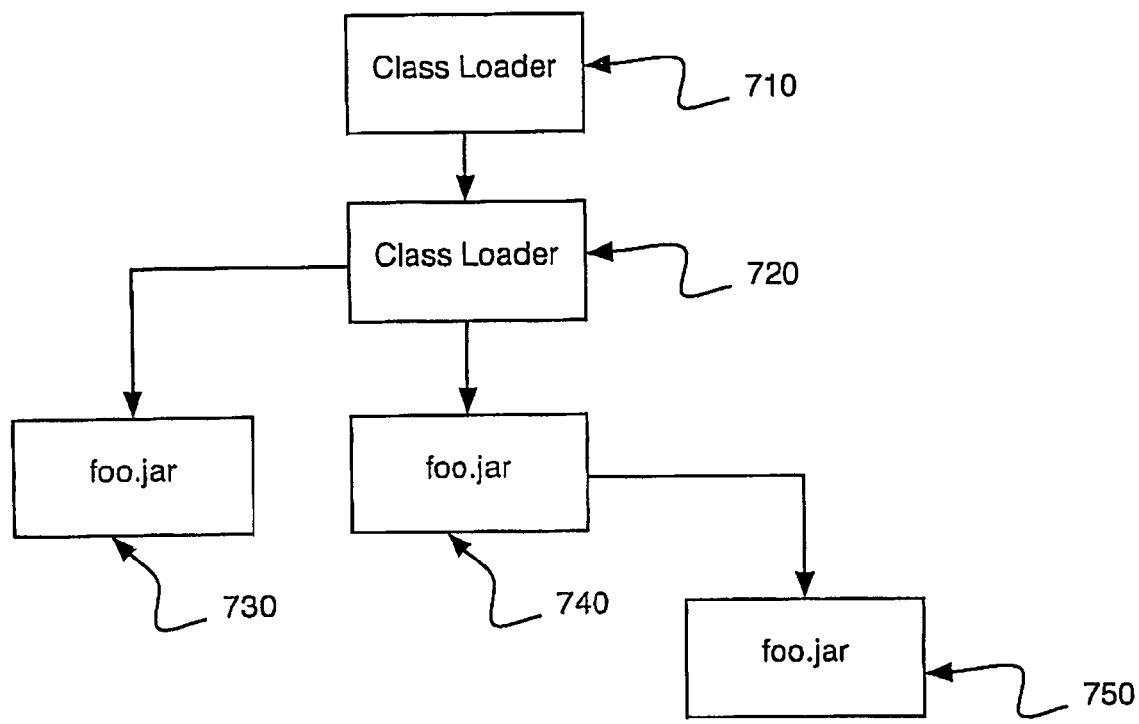
FIG. 7 is a diagram illustrating a class loader architecture including a shared code-source, in accordance with one embodiment of the present invention.

For instance, in FIG. 7, the identical code-source, "foo.jar", may be loaded by three different class loaders 730, 740, and 750 in a class loader architecture 700. The class loader architecture 700 includes class loaders 710 and 720 which are parents of class loaders, 730, 740 and 750. As long as the code-source foo.jar is unique in function within the JVM environment, the reference to the code-source that is a file name is suitable.

Conventionally, as long as two of the class loaders have the code-source, "foo.jar", open, the third class loader (e.g., loader 750) cannot close the code-source, "foo.jar". However, with the use of the central repository 510, once the code-source, "foo.jar", is closed by any class loader, the code-source will close.

In still another embodiment, the reference to the code-source is a digest of the code-source. More specifically, a mathematical digest is generated for each reference to a code-source. Instead of a canonical name or file name match, those digests that match are associated with the same code-source. As such, all of the references to the code-sources with identical digests are combined into a single shared code-source.

Referring back to FIG. 6, the central repository 510 also includes a state for every code-source stored. Specifically, the code-source shown in FIG. 6 includes the state 620. The state of the code-source is taken from the following group: open, closed, suspended, destroyed, and orphaned.

The state 620 includes an open and closed state for every code-source. The open state indicates that an operating system resource (e.g., file handle) is being consumed. That is, the operating system has knowledge about the file. When the code-source is closed, no operating system resources are consumed. That is, the underlying file is closed. As such, through the use of shared code-sources, the state of a code-source is independent during the life of the class loader. That is, a code-source can be closed or opened automatically, if necessary during the life of the class loader. For example, if a code-source has not been used for a period of time, then that code-source can be closed automatically. Conversely, whenever the class loader requires a closed code-source, that code-source is automatically opened. This process provides and additional resource management tool.

The state 620 also includes a suspended state. In the suspend state, access to the code-source is suspended until the suspend state is released. That is, the code-source is unavailable for use by anyone except for the entity that caused the suspended state. For example, a code-source may be used by two class loaders, and is in an open state. The state may change to a suspended state when a method is invoked that implements a thread asking the code-source to perform some operation. During the performance of the operation, the method that is invoked suspends the state of the code-source until the operation is completed. At that point, the suspend state can be released.

In still another embodiment, the state includes a destroyed state. The destroyed state indicates that the code-source is not being used by any class loaders. In addition, the code-source is being deleted from the centralized repository 510. For example, when the last class loader utilizing a code-source closes or no longer is using the code-source, the code-source is placed in a destroyed state and deleted from the centralized repository 510. That is, the code-source is automatically closed and released when the last subscriber unsubscribes from the code-source, as will be described below. As such, the code-source needs to be re-registered in order for a class loader to load the code-source, such as when restarting applications.

In another embodiment, to avoid excessive thrashing during application re-deploy of the same code-source, a cache of finite size is implemented. That is, when a code-source is unsubscribed, rather than destroying the code-source, the code-source is placed into the cache (e.g., a least recently used [LRU] cache). As such, the cache acts as a serial buffer that continually takes in code-sources that are to be destroyed. While the code-source is in the cache, the state of the code-source is "orphaned", in one embodiment. Those code-sources still in the cache can be redeployed without any delay as long as the code-source is in the cache.

However, when a code-source is written over or bumped out of the cache, the cache is effectively destroyed, since all reference to the code-source have been deleted.

In still another embodiment, a periodic maintenance task runs (e.g., once per minute) that closes any code-sources that have not been accessed during a pre-determined time.

The central repository 510 also includes a list of subscribing class loaders for the code-source stored in the repository 510. The list includes those class loaders that are using the code-source. As such, those class loaders are subscribing to the code-source. In addition, the central repository 510 deletes a class loader from the list 630 when the class loader unsubscribes from the code-source.

While embodiments of the present invention are disclosed within the context of manipulating shared code-sources in general, other embodiments are well suited to the manipulation of shared code-sources located in jars, still other embodiments are well suited to the manipulation of shared code-sources located in directories, and still other embodiments are well suited to the manipulation of shared code-sources located in databases.

Figure 8:
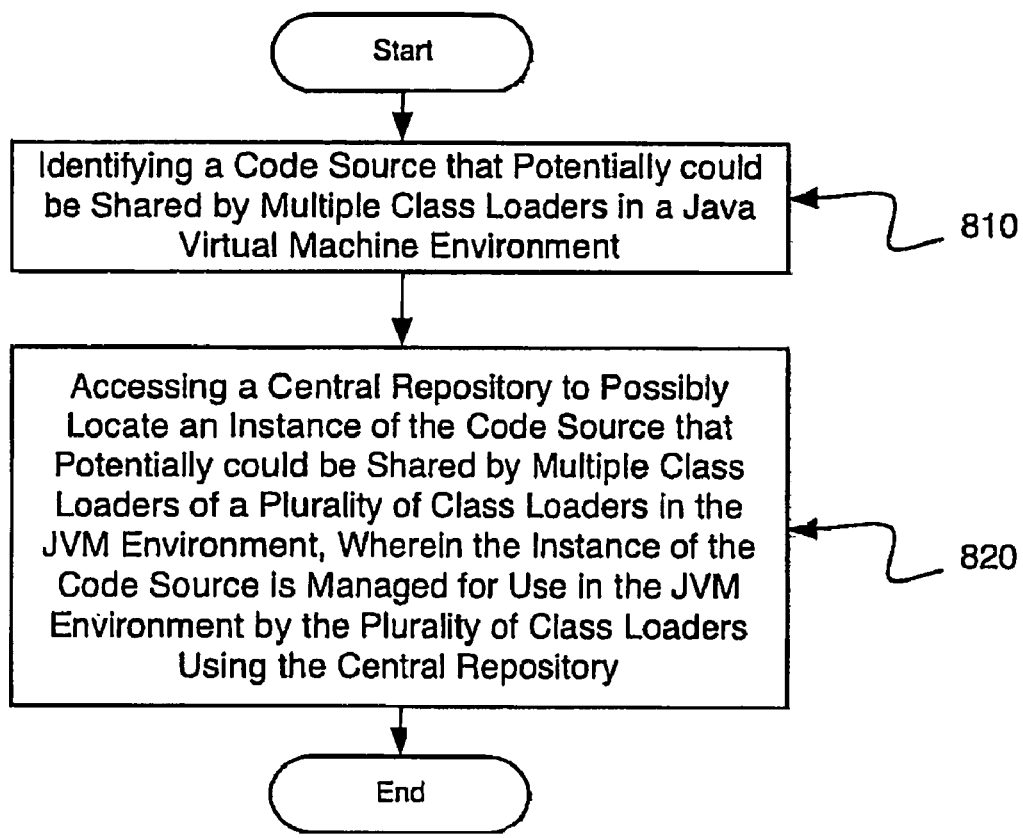
FIG. 8 is a flow chart illustrating steps in a computer implemented method for sharing code-sources in a JVM environment, in accordance with one embodiment of the present invention.

FIG. 8 is a flow chart illustrating steps in a computer implemented method for sharing code-sources in a JVM environment, in accordance with one embodiment of the present invention. The present embodiment is implemented within a class loader tree that utilizes policy class loaders, for example.

At 810, the present embodiment identifies a code-source that is being called. The code-source potentially could be shared by multiple class loaders in the JVM environment. As described previously, the code-source is identified by a canonical name of the code-source, in one embodiment. The canonical name is unique in the JVM environment. In another embodiment, the code-source is identified by file name, as previously described. This is possible if file names are unique across all directories. That is, the file name in the central repository is unique within the JVM environment. In still another embodiment, the code-source is identified by a mathematical digest associated with the code-source.

At 820, the present embodiment accesses a central repository to possibly locate an instance of a code-source that is being called. The code-source potentially could be shared by multiple class loaders of a plurality of class loaders in the JVM environment. The central repository manages an instance of the code-source for use in the JVM environment by the plurality of class loaders. More specifically, the central repository manages instances of all code-sources that are used in the JVM environment by the plurality of class loaders.

In one embodiment, the central management of shared code-sources enables diagnostic code to locate and query any code-source, independently of class loaders. That is, the centralized repository and its subscription mechanism provides for a mapping from code-source back to class loaders that are subscribing to the code-source. More specifically, the present embodiment is able to identify a list of class loaders in the JVM environment that subscribe to the instance of the code-source.

In addition, the present embodiment is able to add a first class loader to the list. The first class loader is accessing the instance of the code-source and is subscribing to the code-source.

Also, the present embodiment is able to remove a second class loader from the list. Removal of the second class loader from the list indicates that the second class loader is not accessing the instance of the code-source.

In still another embodiment, the state of the code-source is identified. The state includes, an open state, a closed state, a suspended state, an orphaned state, and a deleted or destroyed state, all of which were previously described.

In another embodiment, the instance of the code-source is created when the instance is not registered in the central repository. That is, when the code-source is added to a class loader, the instance of the code-source is created and registered with the central repository if it has not been previously registered.

Accordingly, various embodiments of the present invention disclose a system and method for shared code-sources in a JVM environment that can be implemented for class loading. In particular, embodiments of the present invention provide for a centralized management of code-sources in a JVM environment, regardless of the class loader. In addition, embodiments of the present invention significantly reduces the memory and disk storage space used for managing code-sources in a JVM environment. Also, embodiments of the present invention are capable of providing updates to the shared code-source files stored on disk during active usage. Furthermore, embodiments of the present invention provide for access to diagnostic information through the centralized management of code-sources.

While the methods of embodiments illustrated in flow chart 800 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a system and method for shared code-sources in a JVM environment that can be implemented for class loading are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A non-transitory computer-readable medium having sets of instructions for referencing a plurality of code-sources for object-oriented programming language class loaders in an object-oriented programming language virtual machine environment having sets of instructions which, when executed by a computer cause the computer to:

identify a plurality of code-sources which are shared by a plurality of class loaders in said object-oriented programming language environment;

initialize a single instance of each of the plurality of code-sources;

store, in a central repository, each of the single instances of the plurality of code-sources, wherein each single instance of said plurality of code-sources are managed for use in said object-oriented programming language environment by said plurality of class loaders using the central repository;

initialize a state of each of the single instances of said plurality of said code-sources;

list the plurality of class loaders in said object-oriented programming language environment as subscribing to the respective code sources, wherein class loaders in said list subscribe to at least one of said plurality of code-sources;

receiving an instantiation request for one of the plurality of code-sources from at least two different class loaders from the plurality of class loaders; and providing the two different class loaders with access to the central repository to access the same single instance of the code-source.

2. The non-transitory computer-readable medium of claim 1, wherein said plurality of code-sources each include a canonical name that is unique in said object-oriented programming language environment.

3. The non-transitory computer-readable medium of claim 1, wherein said reference comprises a file name.

4. The non-transitory computer-readable medium of claim 1, wherein plurality of code-sources each include a digest of each code-source.

5. The non-transitory computer-readable medium of claim 1, wherein said state further comprises:
   an open state, wherein said code-source is used by at least one class loader in said object-oriented programming language environment; and
   a closed state.

6. The non-transitory computer-readable medium of claim 1, wherein said state further comprises:
   a suspend state, wherein access to each of the plurality of code-sources is suspended until said suspend state is released.

7. The non-transitory computer-readable medium of claim 1, wherein said state further comprises:
   an orphaned state indicating that no class loaders are subscribing to said code-source, wherein said code-source is serially stored in a cache comprising a fixed number of entries; and
   a destroyed state indicating that no class loaders are subscribing to said code-source and said code-source is not stored in said cache.

8. The non-transitory computer-readable medium of claim 1, wherein at least one of said plurality of class loaders comprises a policy class loader.

9. A system for sharing code-sources in an object-oriented programming language environment, comprising:
   a memory device storing sets of instructions;
   a processor coupled with the memory device, wherein the processor is configured to execute the sets of instructions, which case the processor to:
   identify a plurality of a code-sources which are shared by a plurality of class loaders in said object-oriented programming language environment;
   initialize a single instance of each of the plurality of code-sources;
   store, in a central repository, each of the single instances of the plurality of code-sources, wherein each single instance of said plurality of code-sources are managed for use in said object-oriented programming language environment by said plurality of class loaders using the central repository;
   initialize a state of each of the single instances of said plurality of said code-sources;
   list the plurality of class loaders in said object-oriented programming language environment as subscribing to the respective code sources, wherein class loaders in said list subscribe to at least one of said plurality of code-sources;
   receiving an instantiation request for one of the plurality of code-sources from at least two different class loaders from the plurality of class loaders; and
   providing the two different class loaders with access to the central repository to access the same single instance of the code-source.

10. A computer system comprising:
   a processor;
   a bus coupled to said processor; and
   a computer readable medium coupled to said bus containing program instructions that when implemented cause said processor to implement a method for sharing code-sources in an object-oriented programming language, comprising:
   identify a plurality of code-sources which are shared by a plurality of class loaders in said object-oriented programming language environment;
   initialize a single instance of each of the plurality of code-sources;
   store, in a central repository, each of the single instances of the plurality of code-sources, wherein each single instance of said plurality of code-sources are managed for use in said object-oriented programming language environment by said plurality of class loaders using the central repository;
   initialize a state of each of the single instances of said plurality of said code-sources;
   list the plurality of class loaders in said object-oriented programming language environment as subscribing to the respective code sources, wherein class loaders in said list subscribe to at least one of said plurality of code-sources;
   receiving an instantiation request for one of the plurality of code-sources from at least two different class loaders from the plurality of class loaders; and
   providing the two different class loaders with access to the central repository to access the same single instance of the code-source.

11. The computer system of claim 10, wherein said identifying a code-source in said method comprises:
   identifying a canonical name of each of said plurality of said code-sources, wherein said canonical name is unique in said object-oriented programming language environment.

12. The computer system of claim 10, further comprising identifying a digest of each of said plurality of code-sources.

13. The computer system of claim 10, wherein said method further comprises:
   adding a first class loader to said list indicating that said first class loader is accessing said single instance of said one of said plurality of code-sources; and
   removing a second class loader from said list indicating that said second class loader is not accessing said single instance of one of said, plurality of said code-sources.

14. The computer system of claim 10, wherein said method further comprises:
   identifying a state of each of said plurality of said code-sources, wherein said state is taken from a group consisting of:

an open state;
a closed state;
a suspend state, wherein access to each of said plurality of said code-sources is suspended until said suspend state is released;
an orphaned state indicating that no class loaders are subscribing to each of said plurality of said code-sources, wherein said code-source is serially stored in a cache comprising a fixed number of entries; and
a destroyed state indicating that no class loaders are subscribing to each of said plurality of said code-sources and said code-source is not stored in said cache.

15. The computer system of claim 10, wherein said method further comprises:
creating said single instance of each of said plurality of said code-sources when said single instance is not registered in said central repository; and
registering said single instance in said central repository.

16. The computer system of claim 10, wherein at least one of said plurality of class loaders comprises a policy class loader.

* * * * *

UNITED STATES PATENT AND TRADEMARK OFFICE
CERTIFICATE OF CORRECTION

| | |
|---|---|
| PATENT NO. | : 7,814,472 B2 |
| APPLICATION NO. | : 11/225535 |
| DATED | : October 12, 2010 |
| INVENTOR(S) | : Bryan Atsatt |

It is certified that error appears in the above-identified patent and that said Letters Patent is hereby corrected as shown below:

On sheet 4 of 8, in Figure 4, Box No. 410, line 1, delete "Identifer" and insert -- Identifier --, therefor.

In column 13, line 54, in claim 9, delete "case" and insert -- cause --, therefor.

In column 13, line 55, in claim 9, after "of" delete "a".

In column 14, line 62, in claim 13, delete "said," and insert -- said --, therefor.

Signed and Sealed this
Seventh Day of June, 2011

David J. Kappos
*Director of the United States Patent and Trademark Office*